United States Patent [19]

Okamura et al.

[11] Patent Number: 4,995,161
[45] Date of Patent: Feb. 26, 1991

[54] ELECTRICALLY CONTROLLED MACHINE TOOLS WITH TOOL CHANGING MEANS

[75] Inventors: Yasushi Okamura, Yamaga; Toshiro Sosogi, Tamana; Kosuke Takaki, Hotaku, all of Japan

[73] Assignee: Matsushita Electric Industrial Co., Ltd., Osaka, Japan

[21] Appl. No.: 374,921

[22] Filed: Jul. 3, 1989

[30] Foreign Application Priority Data

| Jul. 1, 1988 [JP] | Japan | 63-165426 |
| Jul. 1, 1988 [JP] | Japan | 63-165428 |
| Aug. 17, 1988 [JP] | Japan | 63-204314 |

[51] Int. Cl.⁵ ............................................. B23Q 3/157
[52] U.S. Cl. .................................... 29/568; 279/1 M; 408/35
[58] Field of Search ............... 29/568, 264; 279/1 M; 408/35

[56] References Cited

U.S. PATENT DOCUMENTS

| 2,479,584 | 8/1949 | Meyer | 279/1 M |
| 3,073,024 | 1/1963 | Hutchens et al. | 29/568 |
| 3,133,349 | 5/1964 | Riedel | 29/568 |
| 3,174,222 | 3/1965 | Pohl | 29/568 |
| 4,145,802 | 3/1979 | d'Auria | 29/568 |

Primary Examiner—Z. R. Bilinsky
Attorney, Agent, or Firm—Wenderoth, Lind & Ponack

[57] ABSTRACT

A machine tool which has a chassis, a chuck support rotatably mounted on the chassis and removably carrying a plurality of chucks in a circular row and each holding an associated rotatable processing tool and a chuck carrier operable to remove one of the chucks, carried by the chuck support and brought to a predetermined position relative to the chassis, from the chuck support, and a chuck drive unit for driving the chuck, removed from the chuck carrier, to bring the processing tool into a condition ready to process a workpiece.

4 Claims, 5 Drawing Sheets

ELECTRICALLY CONTROLLED MACHINE TOOLS WITH TOOL CHANGING MEANS

BACKGROUND OF THE INVENTION

1. Field of the Invention

The present invention generally relates to machine tools and, more particularly, to a machine tool adapted to be controlled by an electric circuit.

2. Description of the Prior Art

Of the boring machines for making one or more holes in a workpiece, a drilling machine, specifically a jig-boring machine, is widely used which employs a drilling tool for making one or more holes in the workpiece. While the present invention is applicable to any type of machine tools designed to bore the workpiece, reference will be made to the jig-boring machine for the discussion of the prior art.

FIG. 6 of the accompanying drawings illustrates an example of the prior art jig-boring machine in schematic side view. As shown therein, the prior art jig-boring machine comprises a drive motor mounted on an upright column 9 and having a drive pulley 2 mounted on a drive shaft of the motor 1 for rotation together therewith. The jig-boring machine 1 also comprises a spindle 4 supported for rotation about its own longitudinal axis by a support sleeve fast with the column 9 and has a driven pulley 3, a drive belt 5 drivingly trained between the drive and driven pulleys 2 and 3 so that the drive of the drive motor 1 can be transmitted to the spindle 4 through the drive belt 5. As shown, each of the drive and driven pulleys 2 and 3 is of a type having belt grooves of different outer diameters, that is, having a large-diameter belt groove, a small-diameter belt groove and an intermediate diameter groove having a groove size intermediate between the large- and small-diameter belt grooves.

The spindle 4 has a lower free end to which a drill chuck 6 is secured for rotation together with the spindle 4, said drill chuck 6 being adapted to receive and support a drilling tool 7 in a removable fashion and positioned immediately above a worktable 8 supported on the column 9 for movement up and down. The sleeve 4 and, hence, the drilling tool 7 received by the drill chuck 6 can be moved up and down in a direction lengthwise of the spindle 4 by turning a manual handle bar 10 drivingly coupled with the sleeve 4 so as to move the latter up and down.

With the jig-boring machine of the above described construction, the boring process is performed in the following sequence.

In the first place, the position of the worktable 8 relative to the upright column 9 has to be adjusted, followed by the placement of a workpiece on the worktable 8 immediately below the drill chuck 6. Thereafter, the drilling tool 7 of a design appropriate to the size of a hole desired to be formed in the workpiece is secured to the drill chuck 6. After the seed of revolution of the spindle 4 has been selected in consideration of the material of the workpiece and the size (diameter) of the drilling tool 7, the drive belt 5 trained between the drive and driven pulleys 2 and 3 is repositioned so as to engage in one of the belt grooves of different diameters in each of the drive and driven pulleys 2 and 3 so that the seed of revolution of the spindle 4 can attain a desired or required value selected in the manner as hereinabove described. The drive motor 1 is then electrically energized to drive the drive pulley 2 and, hence, the sleeve 4 through the drive belt 5. While the sleeve 4 is so driven about its own longitudinal axis, the manual handle bar 10 is turned so as to lower the spindle 4 with the drilling tool 7 subsequently driven into the workpiece on the worktable 8 to form a hole.

When it comes to the replacement of the drilling tool 7 with a different drilling tool, the drill chuck 6 has to be loosened or undone to allow the drilling tool 7 to be released therefrom, followed by the insertion of the different drilling tool into the same drill chuck 6 with the drill chuck 6 subsequently fastened to firmly hold the different drilling jig.

According to the prior art jig-boring machine of the type described above, unless the replacement of the drilling tool is carried out by a skilled attendant worker, it often occurs that the drilling tool may be inserted into the drill chuck in the wrong way, for example, slantwise relative to the drill chuck or in axially offset relationship with the center of the drill chuck. The worst of all is that the drilling tool may be bent or broken and that a hole subsequently formed in the workpiece may depart from the design requirements. In view of the foregoing, the prior art drilling machine requires a skilled attendant worker to perform the replacement of the drilling tool.

While the types of drilling tools available for one particular type of machine tool are many, and while automated drilling machines are also currently available and utilized, an automatic replacement of the drilling tools in the automated drilling machines has not yet been accomplished because the mounting of any one of the drilling tools on the drill chuck cannot be performed without difficulty.

SUMMARY OF THE INVENTION

Accordingly, the present invention has been devised with a view to substantially eliminating the above described problem inherent in the conventionally utilized drilling machines and has for its essential object to provide an improved electrically controlled machine tool wherein replacement of processing bits can be accomplished automatically.

To this end, the present invention provides a machine tool embodying the present invention comprises a chassis, a chuck support rotatably mounted on the chassis and removably carrying a plurality of chucks in a circular row, each of the chucks holding an associated processing tool, a chuck carrier operable to remove one of the chucks, carried by the chuck support and brought to a predetermined position relative to the chassis, from the chuck support, and a chuck drive unit for driving the chuck, removed from the chuck carrier to bring the processing tool in a condition ready to process a workpiece.

According to the present invention, since the processing bits are carried by the drill chucks, the replacement of the processing tools can readily be accomplished in a unit of a chuck assembly. Also, since the chucks are supported by the chuck support in the circular row and the chuck support is rotatable, the replacement of the processing bits can be accomplished automatically.

BRIEF DESCRIPTION OF THE DRAWINGS

These and other objects and features of the present invention will become clear from the following description taken in conjunction with the accompanying drawings, in which.

DETAILED DESCRIPTION OF THE INVENTION

Figure 1:
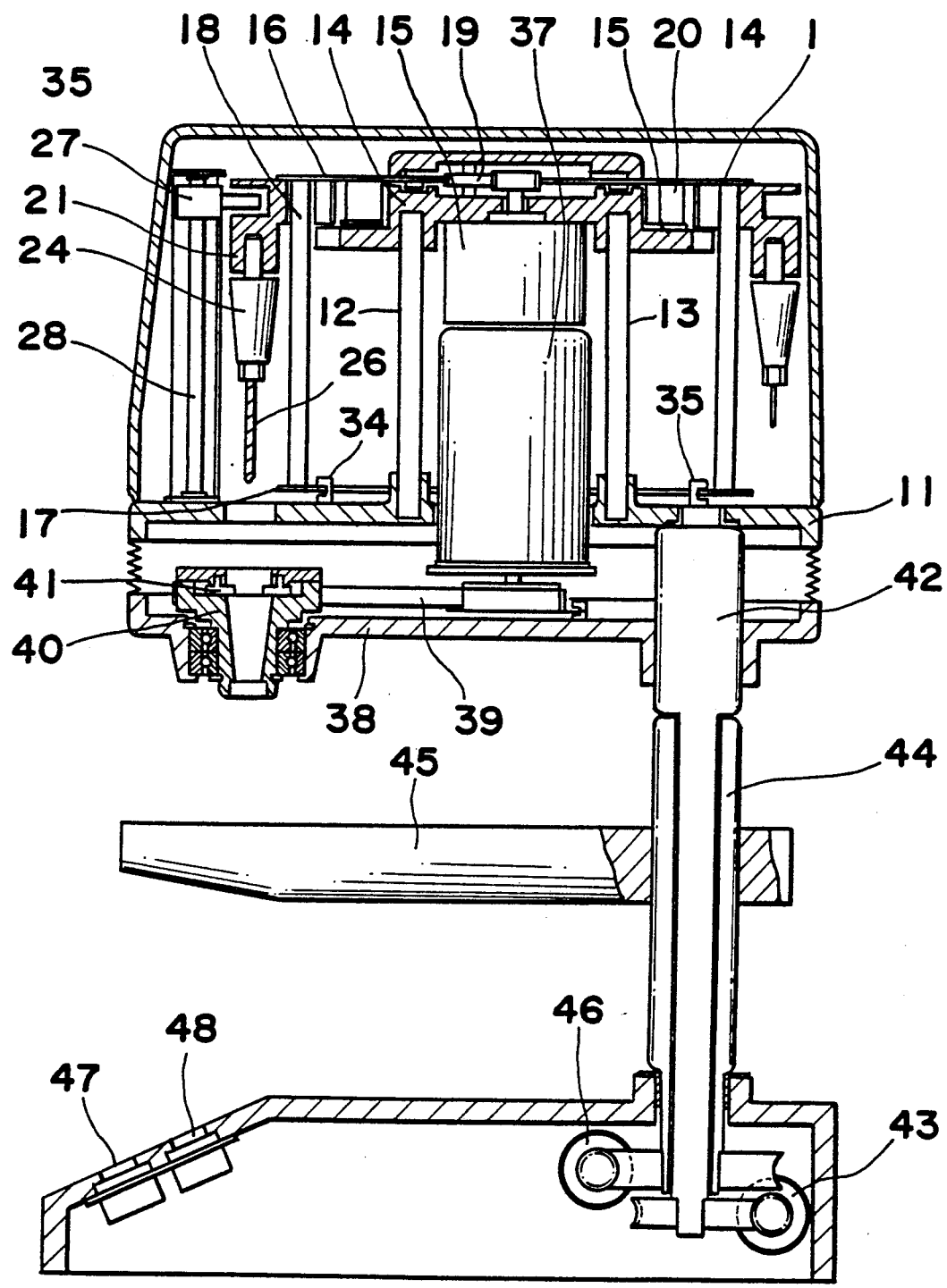
FIG. 1 is a side sectional view of a drilling machine embodying the present invention.

Referring to FIGS. 1 to 4, an automated drilling machine embodying the present invention comprises an upright column assembly including a hollow column or screw pipe 44, having a lower end threadingly extending through a base B so as to terminate within the interior of the base B, and a solid column or screw shaft 42 inserted into the hollow column 44. The screw pipe 44 has a worktable 45 lying in a plane perpendicular to the screw pipe 44 and mounted thereon for adjustment in position between elevated and lowered positions along the screw pipe 44. Specifically, the position of the worktable 45 relative to the screw pipe 44, that is, the height of said worktable 45 above the base B, can be adjusted by turning the screw pipe 44 about its own longitudinal axis. For this purpose, the lower end of the screw pipe 44 situated within the base B is drivingly coupled with a drive motor 46 so that, when the drive motor 46 is driven, the screw pipe 44 can be turned about its own longitudinal axis to cause the worktable 45 to be moved therealong between the elevated and lowered positions.

The screw shaft 42 is of a length greater than the length of the screw pipe 44 and extends through the screw pipe 44 with its upper and lower ends situated outside the screw pipe 44. In particular, the lower end of the screw shaft 42 is situated within the base B and drivingly coupled with a drive motor 43 used to turn the screw shaft 42 about its own longitudinal axis.

The illustrated drilling machine also comprises a lower chassis 11 mounted on the upper end of the screw shaft 42, upright support rods 12 and 13 rigidly mounted thereon so as to extend upwards therefrom and an upper chassis 14 rigidly mounted on the support rods 12 and 13. A tool change drive motor 15 is secured from below to the upper chassis 14 and has a drive shaft drivingly coupled through a plurality of gears 19 with an annular upper rotary disc 16 which is positioned above the upper chassis 14. The annular upper rotary disc 16 is in turn coupled through a plurality of connecting rods 18 with a lower rotary disc 17 positioned below the upper chassis 14 and immediately above the lower chassis 11 so that, when the drive motor 15 is driven, the upper and lower rotary discs 16 and 17 can be rotated together about the longitudinal axis of the drive shaft of the drive motor 15.

Figure 2:
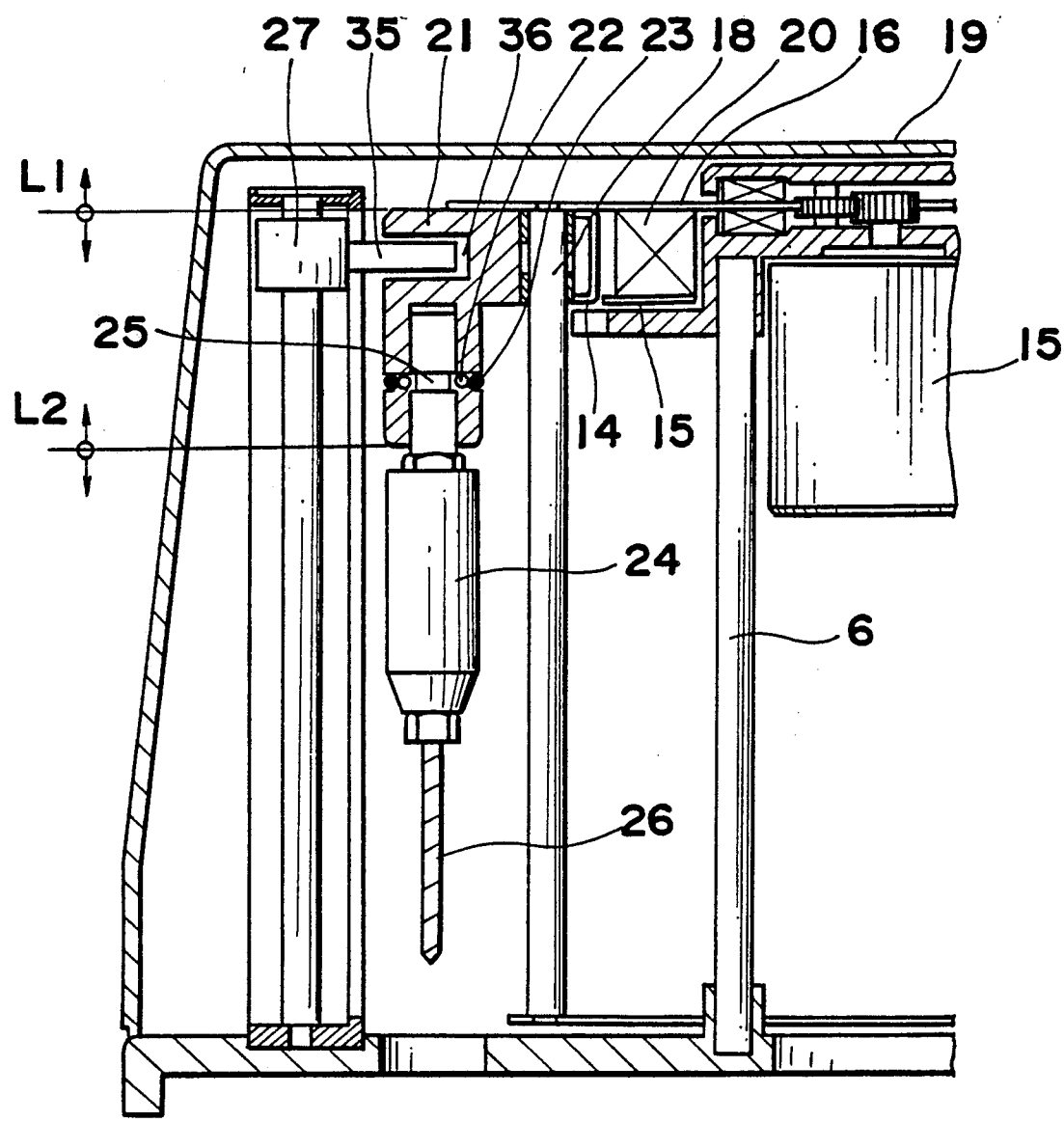
FIG. 2 is a side sectional view, on an enlarged scale, showing a principal portion of the drilling machine shown in FIG. 1.
Figure 3:
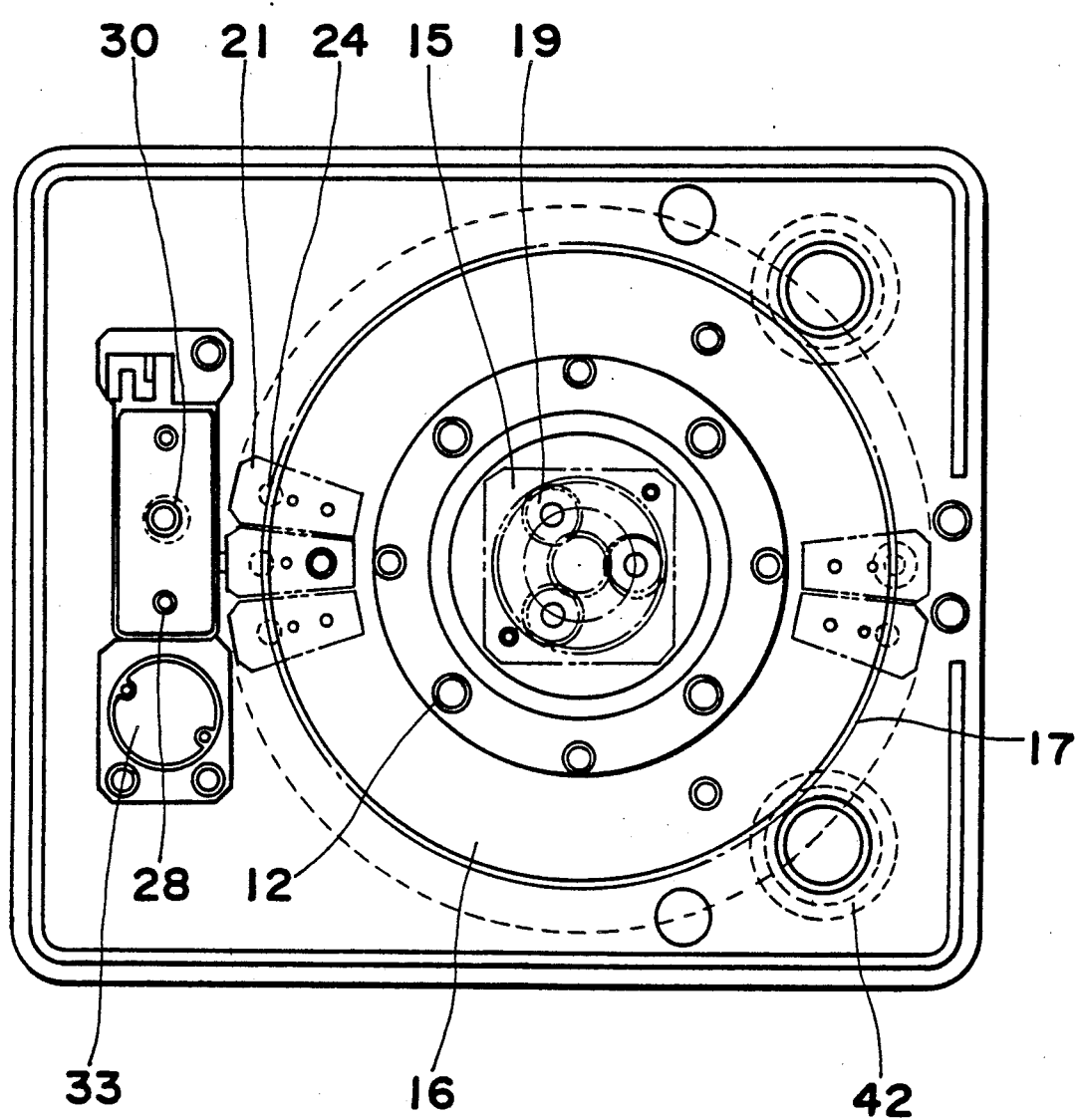
FIG. 3 is a top plan view of the drilling machine shown in FIG. 1, with a top cover removed.

Reference numeral 20 represents a generally ring-shaped magnet for applying a magnetic force to the upper rotary disc 16. Reference numeral 21 represents a plurality of chuck holders arranged in a circular row coaxial with the drive shaft of the drive motor 15 as best shown in FIG. 3. Each of the chuck holders 21 is slidably mounted on the associated connecting rod 18 and is normally shifted upwards along the associated connecting rod 18 while magnetically attracted to the upper rotary disc 16 by the effect of the magnetic force developed by the ring-shaped magnet 20. As best shown in FIG. 2, each of the chuck holders 21 has a plurality of radial holes defined therein and carries a respective drill chuck 24 having a stem inserted into such chuck holder 21 and retained in position by means of steel balls 22 which are inserted in the respective radial holes in the associated chuck holder 21 and are biased radially inwardly by a respective O-ring 22, which may be made of rubber or any other elastic material, so as to protrude into a circumferentially extending groove 25 defined in the stem of the respective drill chuck 24.

Each drill chuck 24 has a drilling tool 26 chucked thereby so as to extend downwards. It is to be noted that the drilling tools 26 carried by the respective drill chucks 24 arranged in a circular row concentric with the drive shaft of the drive motor 15 are of different diameters so that holes of different diameters ca be formed by the respective drilling tools 26.

Figure 4:
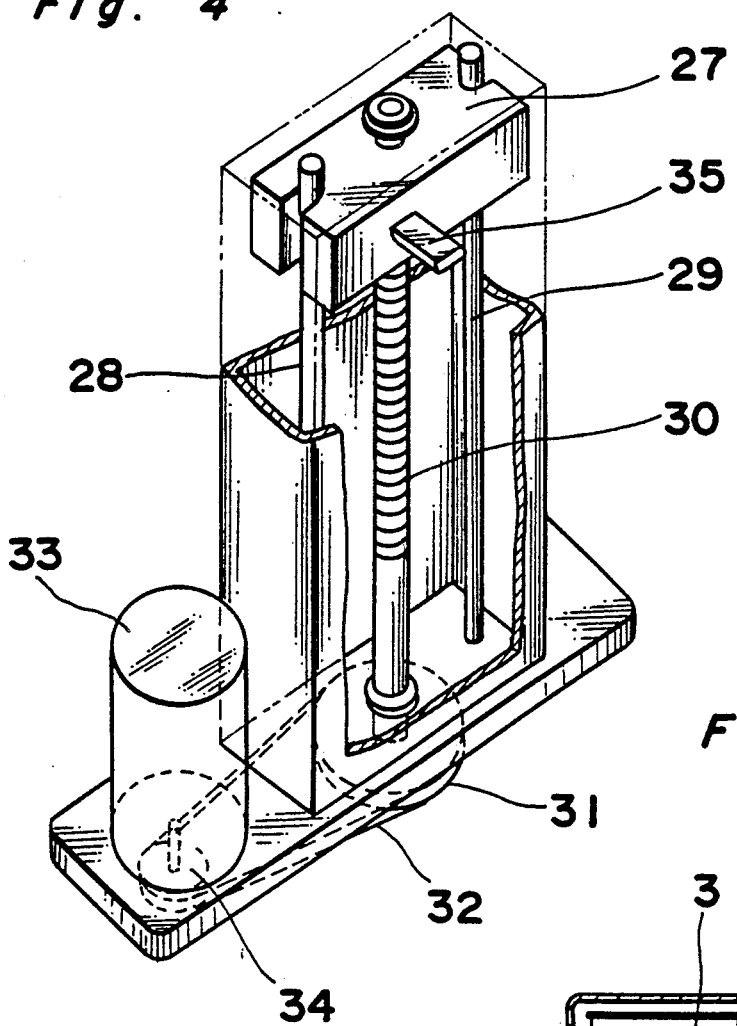
FIG. 4 is a schematic perspective view, on an enlarged scale, showing the principal portion of the drilling machine.
Figure 6:
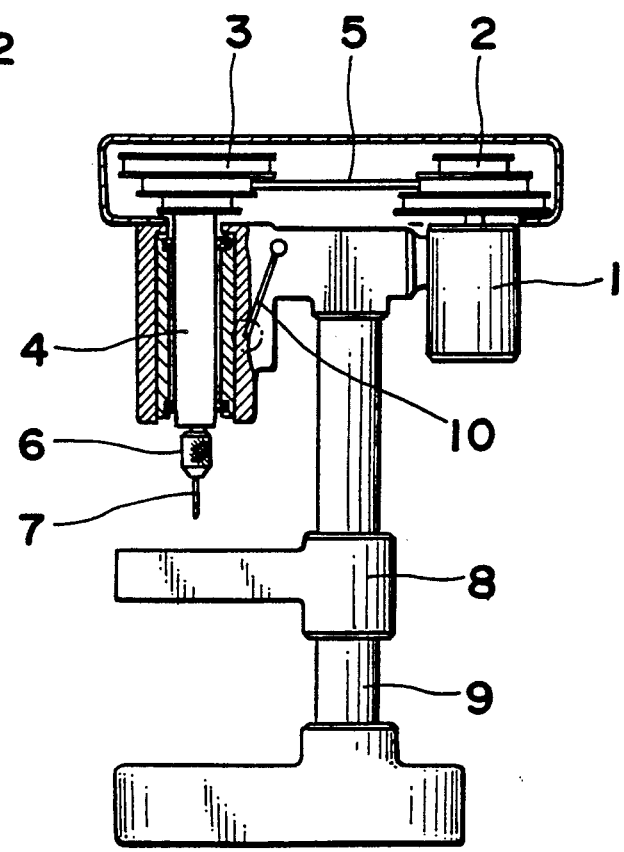
FIG. 6 is a schematic side sectional view of the prior art drilling machine, reference to which has already been made.

Reference numeral 27 represents a chuck carrier which is, as best shown in FIG. 4, mounted on parallel shafts 28 and 29 for sliding movement between upwardly and downwardly shifted positions in a direction perpendicular to the lower chassis 11. For moving the chuck carrier 27 between the upwardly and downwardly shifted positions along the parallel shafts 28 and 29, a screw shaft 30 has a lower end having a driven pulley 31 mounted thereon for rotation together with the screw shaft 30, an upper end portion of said screw shaft 30 extending threadingly through the chuck carrier 27. The driven pulley 31 is drivingly coupled by means of an endless belt 32 with a drive pulley 34 rigidly mounted on a drive shaft of a drive motor 33 rigidly mounted on the lower chassis 11.

The chuck carrier 27 has a finger 35 secured rigidly thereto or otherwise formed integrally therewith so as to extend outwardly therefrom, which finger 35 is engaged in a recess 36 defined in any one of the chuck holders 21 which can be selectively brought to a position confronting the finger 35 as will be described later.

Reference numeral 37 represents a main drive motor 37 mounted on a spindle carrier table 38 positioned immediately below the lower chassis 11, said drive motor 37 having a drive shaft drivingly coupled with a spindle 40 through an endless belt 39 for driving the latter about the longitudinal axis thereof. The spindle 40 is provided with a chuck retaining pawls 41 which are so designed and so arranged that, when the main drive motor 37 is driven in one of opposite directions, for example, a first direction, the retaining pawls are driven radially inwardly by a torque of the main drive motor 37 to provide a reduced inner diameter, but when the main drive motor 37 is driven in a second direction opposite to the first direction, the retaining pawls are driven radially outwardly by the torque of the main drive motor 37 to provide an enlarged inner diameter.

The spindle carrier table 38 can be shifted up and down along the column assembly and, for this purpose, the spindle carrier table 38 is threadingly mounted on the upper end portion of the screw shaft 42. Thus, it will readily be seen that, when the drive motor 43 is operated, the screw shaft 42 can be turned about its own longitudinal axis allowing the spindle carrier table 38 to be moved relative to and along the screw shaft 42.

Referring to FIG. 1, the base B has an operating switch 47 and a display unit including a light emitting diode 48.

Figure 5:
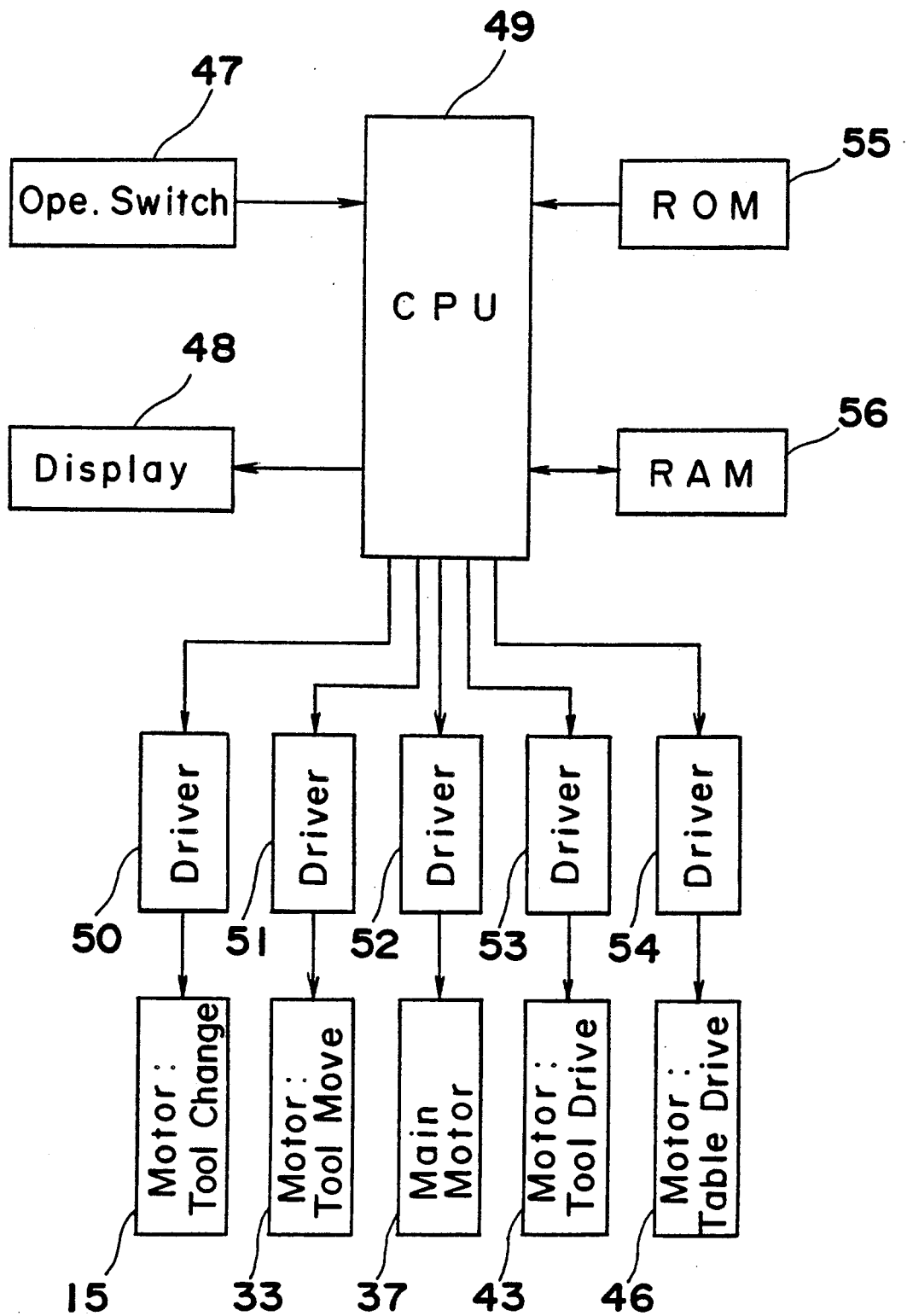
FIG. 5 is a schematic circuit block diagram showing an electric circuitry employed in the drilling machine of the present invention.

Referring now to FIG. 5, there is shown, in the form of a circuit block diagram, an electric circuitry employed in the drilling machine embodying the present invention. The electric circuitry in the illustrated drilling machine comprises a microprocessor (CPU) 49 having an input port connected with the operating switch 47 and also having output ports connected respectively with the display unit 48 and drive circuits 50 to 54 which are in turn connected with the associated motors 15, 33, 37, 43 and 46. The microprocessor 49 is also connected with a read-only memory (ROM) 55 and a random access memory (RAM) 56, both connected with input and output ports of the microprocessor 49.

The drilling machine of the above described construction operates in the following manner.

In the first place, a workpiece is placed on the worktable 45 and a power supply switch is then turned on. Thereafter, the operating switch 47 is operated to drive the tool change drive motor 15. When the drive motor 15 is so driven, the upper rotary disc 16 is rotated to bring a desired one of the chuck holders 21 to the position where it confronts the chuck carrier 27. Thereafter, the drive motor 33 is operated. Consequent upon the operation of the drive motor 33, the chuck carrier 27 is lowered along the parallel shafts 28 and 29 to insert the associated drill chuck 24 into the spindle 40. When the main motor 37 is instantaneously driven in the first direction, the retaining pawls 41 are radially inwardly driven to firmly grip the drill chuck 24 then inserted into the spindle 40, thereby avoiding any possible separation of the drill chuck 24 from the spindle 40.

Subsequently, the drive motor 46 is driven to shift the worktable 45 to a desired or required position to permit the tip of the drilling jig 26 to be properly spaced from an upper surface of the workpiece placed on the worktable 45. The main motor 37 is then driven in the first direction to drive the drilling tools 26 about its own longitudinal axis. While the drilling tools 26 is so driven, the spindle carrier table 38 is lowered by a distance corresponding to the amount of boring effected by the drilling tool 26 to a workpiece on the worktable 45 to accomplish the cutting to form a hole in the workpiece.

After the hole has been formed in the workpiece, the main drive motor 37 is instantaneously driven in the second direction to drive the retaining pawls 41 radially outwardly to permit the drill chuck 24 to be in a releasable condition. Then, after the chuck holder 21 has been lowered until the stem of the chuck 24 is elastically inserted into the chuck holder 21, the chuck holder 21 is shifted upwards to remove the drill chuck 24, then engaged in the spindle 40 in the releasable condition, from the spindle 40, until the chuck holder 21 is magnetically attracted by the upper rotary disc 16, thereby completing one cycle of operation.

As hereinbefore fully described, the machine tool embodying the present invention comprises a chassis, a chuck support rotatably mounted on the chassis and removably carrying a plurality of chucks in a circular row, each of the chucks holding an associated processing bit, a chuck carrier operable to remove one of the chucks, carried by the chuck support and brought to a predetermined position relative to the chassis, from the chuck support, and a chuck drive unit for driving the chuck, removed from the chuck carrier to bring the processing tool in a condition ready to process a workpiece. With this machine tool, the replacement of the processing tools can readily be accomplished merely by turning the chuck support. Therefore, if a number of processing tools are accommodated, the replacement of the processing tools can be accomplished automatically.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

We claim:

1. A machine tool which comprises a chassis, a magnetic chuck support rotatably mounted on the chassis and magnetically removably carrying a plurality of chucks in a circular row, each of said chucks holding an associated rotatable processing tool, a chuck carrier operable to remove one of the chucks, carried by the chuck support and brought to a predetermined position relative to the chassis, from the chuck support, and a chuck drive unit for driving the chuck, removed from the chuck carrier, to bring the processing tool into a condition ready to process a workpiece.

2. The machine tool as claimed in claim 1, further comprising a drive motor for the processing tools arranged in a coaxial relationship with the chuck support.

3. A machine tool which comprises a chassis, a magnetic chuck support rotatably mounted on the chassis and magnetically removably carrying a plurality of chucks in a circular row, each of said chucks holding an associated rotatable processing tool, a chuck carrier operable to remove one of the chucks, carried by the chuck support and brought to a predetermined position relative to the chassis, from the chuck support, and a chuck drive unit having a through-hole defined therein for the passage of the processing tool held by the chuck which has been removed from the chuck support, said drive unit being operable to drive the chuck, removed from the chuck carrier, to bring the processing tool into a condition ready to process a workpiece.

4. A machine tool which comprises a chassis; a magnetic chuck support rotatably mounted on the chassis and magnetically removably carrying a plurality of chucks in a circular row, each of said chucks holding an associated rotatable processing tool; a chuck carrier operable to remove one of the chucks, carried by the chuck support and brought to a predetermined position relative to the chassis, from the chuck support; a chuck drive unit for driving the chuck, removed from the chuck carrier, to bring the processing tool into a condition ready to process a workpiece; a worktable for the support of the workpiece to be processed; a threaded support member for shifting the worktable up and down; and said drive unit including a drive screw member for shifting the drive unit up and down, said threaded support member and said drive screw member being in coaxial relationship with each other.

* * * * *